United States Patent Office 3,221,553
Patented Dec. 7, 1965

3,221,553
TEMPERATURE SENSING DEVICE
AND METHOD
Street Chang, Walnut Creek, Calif., assignor, by mesne assignments, to High Voltage Engineering Corporation, Burlington, Mass., a corporation of Massachusetts
Filed May 14, 1962, Ser. No. 194,280
1 Claim. (Cl. 73—343)

This invention relates to filled system thermometers and more particularly to a novel method and apparatus for sensing the average interior temperature at a certain depth within a solid wall member.

There are many instances in which it is desirable to determine the average interior temperature of a wall member. This is especially true in the particle accelerator and microwave arts wherein my invention finds particular application. As an example, in order to ensure continuous optimum operating characteristics, it might be required to monitor the temperature of a waveguide or of a particle accelerator housing without introducing apparatus that would create adverse electrical effects.

Conventionally, the temperature within a solid body has been measured by thermoelectric means whereby a thermocouple or resistance bulb is embedded within the solid body and in which the resistance thereof, being responsive to temperature change, is used to activate a temperature indicating device. Since electrical insulation is necessarily incompatible with ideal heat conduction, some sort of compromise must be made which reduces the effectiveness of such a system. Furthermore, in order to obtain an average temperature value around a cylindrical wall, a multiplicity of measuring points would be required, thus adding to the complexity and expense of the system.

Alternatively, the prior art discloses the use of a pneumatic bulb attached to the interior surface of the wall member. The arrangement of the plurality of such bulbs necessary to produce any temperature averaging effect would be cumbersome and impractical. Also, their presence within a waveguide or particle accelerator structure might introduce severe electrical discontinuities. Pneumatic bulbs of this type are commonly too large to permit the placing of the entire sensing element within the wall member.

Accordingly, it is a principal object of my invention to provide a new and improved method for detecting the average interior temperature within a solid enclosing wall member.

It is another object of my invention to provide new and improved apparatus for sensing the average interior temperature at a discrete depth within a solid enclosing wall member.

Still another object of my invention is to provide pneumatic temperature sensing apparatus of the class described wherein the sensing element thereof is an integral part of the wall member such that there is provided thereby direct thermal contact between the activating fluid and said wall member.

Yet another object of my invention is to provide pneumatic temperature sensing apparatus of the class described in combination with a filled system thermometer, said sensing apparatus having a discrete geometry adapted to assure uniformity of heat conduction and being further adapted to furnish an optimum area of contact in relation to the small sensitive mass in the filled system.

And still another object of my invention is to provide a novel filled system thermometer and sensing apparatus having a minimum response lag.

Still another object of my invention is to provide, for determining the interior temperature of a solid enclosing wall member, a novel filled system thermometer and sensing apparatus that is always responsive to the average effect of interior temperature within said solid wall.

These, together with other objects and features of my invention will become more readily apparent from the following detailed description taken in conjunction with the accompanying drawings wherein.

Figure 1:
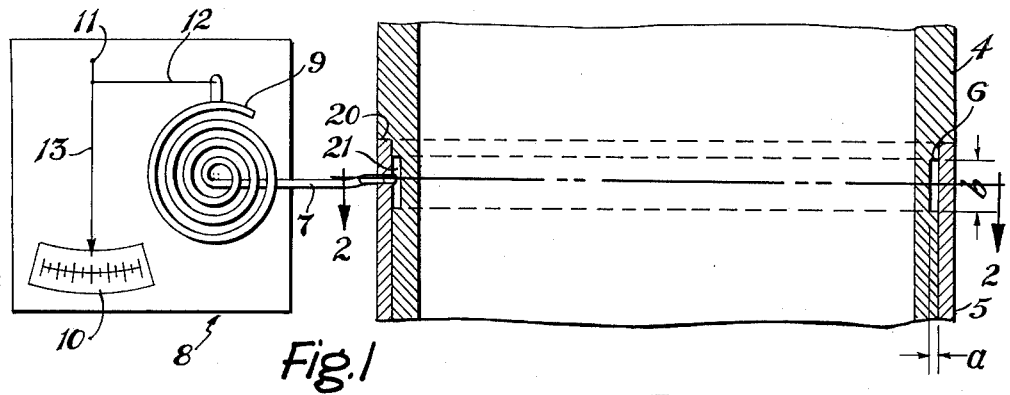
FIGURE 1 illustrates one presently preferred embodiment of my invention.
Figure 2:
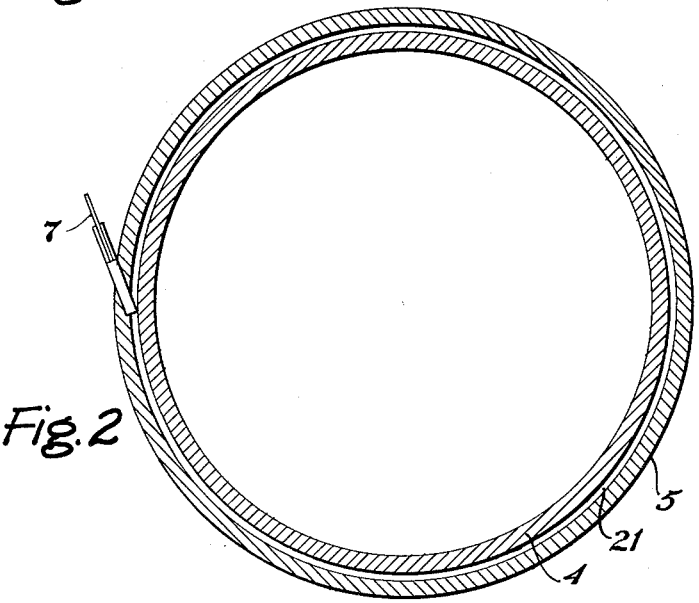
FIGURE 2 is a partial sectional view of FIGURE 1 taken at 2—2.

Referring now to FIGURES 1 and 2 there is illustrated a solid enclosing wall member 4, which may be a metal particle accelerator housing or the like, upon which the method of my invention is practiced, and in combination with which the novel apparatus thereof cooperates. By way of accomplishing the above recited objects I propose to machine a ring groove 6 on the outside surface of said wall member 4 to a depth beyond the mean thickness of the wall. A second groove 20 that overlaps groove 6 is then also machined on the outside surface of wall 4 to a depth less than the mean thickness thereof. A sleeve member 5 of the same material as wall 4 is then inserted into groove 20 and brazed in place to establish a hermetically sealed annular space 21 concentrically disposed within said wall member 4. Said sleeve member 5 thus restores the original surface of the wall member, and, being of the same material as the wall insures continuity of thermal conductance. Annular space 21 may have a rectangular cross section wherein the ratio of width $b$ to depth $a$ may vary in a range between 8 to 1 and 16 to 1 for most practical applications. However, such ratios are by way of illustration only, the geometry and optimal active volume for each individual application being dependent upon the thickness and material of the wall member. Annular space 21 is then made an integral part of a filled system thermometer 8, as shown in FIGURE 1, is generally conventional and disclosed in detail in current literature. Reference to a particular arrangement is made herein, however, in order that the functioning and interconnection of the novel sensing element may be readily understood. Capillary tube 7 communicates directly with Bourdon tube 9 of said thermometer 8. The entire system, that is Bourdon tube 9, capillary tube 7, and annular space 21 is filled with fluid. Usually nitrogen or helium is used, although such fluids as mercury or hydrocarbon liquids are also applicable. The pressure in such a system substantially follows the gas law and a temperature indication is obtained on scale 10 by the effect of the expansion or contraction of Bourdon tube 9 on pointer 13 as it acts through rigid member 12 and pivot 11. Temperature-pressure-motion relationships are nearly linear and atmospheric pressure effects are minimized by filling the system to a high pressure.

Figure 3:
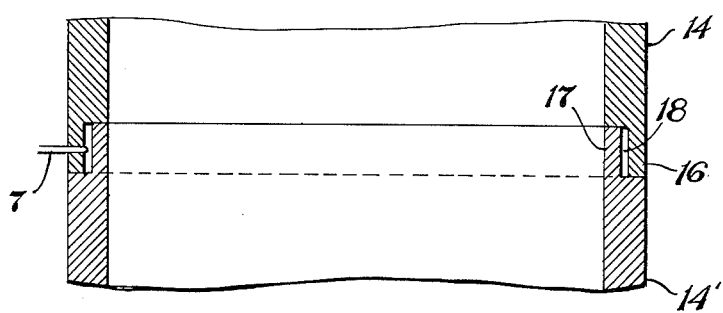
FIGURE 3 illustrates an alternate embodiment of my invention.

Another arrangement whereby the novel sensing element of my invention can be obtained is illustrated in FIGURE 3. The wall member in this case is transversely cut to form two segments 14 and 14'. An annular space 18 is then provided by machining the contiguous ends of segments 14 and 14' to form mutually cooperating concentric rings 16 and 17 as shown. The two members are then brazed together to establish a single continuous wall member having hermetically sealed annular space 18 concentrically disposed therein. A capillary tube 7 is then provided to connect the sensing element (annular space 18 filled with fluid) to the filled system thermometer as described above.

It is to be understood that the above-described arrangements are illustrative of the applications of the principles of my invention only. Numerous other arrangements may be devised by those skilled in the are without departing from the scope of the invention.

What is claimed is:

Apparatus for monitoring the temperature of a circular metal waveguide comprising in combination with a circular metal waveguide a hermetically sealed annular space having an axial width at least eight times its radial depth disposed within the waveguide wall, pressure sensitive temperature indicating means, capillary tube means for connecting said annular space with said temperature indicating means, and a quantity of fluid filling the volume of said annular space and its associated capillary tube, said annular space being established by a first circumferentially disposed groove in said waveguide wall having a depth less than the mean thickness thereof, a second circumferentially disposed groove having a width less than, and residing within, said first groove, said second groove having a depth greater than the mean thickness of the waveguide wall and a cylindrical sleeve member of the same material as said waveguide adapted to cooperate with said first groove so as to hermetically enclose the volume of said second groove residing below the depth of said first groove.

References Cited by the Examiner

UNITED STATES PATENTS

| | | | |
|---|---|---|---|
| 1,276,024 | 8/1918 | Brittin | 73—343 |
| 1,345,829 | 7/1920 | Boyle | 285—230 |
| 2,025,617 | 12/1935 | Schramm | 73—343 |
| 2,804,773 | 9/1957 | Domingo | 73—343 X |
| 3,022,670 | 2/1962 | Sutliffe | 73—368.4 |

FOREIGN PATENTS 363,456  11/1922  Germany.

ISAAC LISANN, *Primary Examiner.*